(12) United States Patent
Reaume et al.

(10) Patent No.: US 11,604,940 B2
(45) Date of Patent: Mar. 14, 2023

(54) SYSTEMS AND METHODS FOR PART IDENTIFICATION AND ASSESSMENT USING MULTIPLE IMAGES

(71) Applicant: Caterpillar Inc., Peoria, IL (US)

(72) Inventors: Daniel Joseph Reaume, Midland, MI (US); Daniela Radakovic, Chicago, IL (US); Daniel Jude Organ, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 17/123,051

(22) Filed: Dec. 15, 2020

(65) Prior Publication Data

US 2022/0188565 A1    Jun. 16, 2022

(51) Int. Cl.
   *G06K 9/62*       (2022.01)
   *G06N 3/08*       (2023.01)

(52) U.S. Cl.
   CPC ......... *G06K 9/6256* (2013.01); *G06K 9/6277* (2013.01); *G06N 3/08* (2013.01)

(58) Field of Classification Search
   None
   See application file for complete search history.

(56) References Cited

U.S. PATENT DOCUMENTS

| | | | |
|---|---|---|---|
| 10,664,722 B1 | 5/2020 | Sharma et al. | |
| 2006/0253491 A1 | 11/2006 | Gokturk | |
| 2019/0347522 A1* | 11/2019 | Nir | G06K 9/6282 |
| 2019/0392318 A1 | 12/2019 | Ghafoor et al. | |
| 2020/0356813 A1 | 11/2020 | Sharma | |
| 2020/0380721 A1* | 12/2020 | Rampal | G06T 7/74 |
| 2021/0182628 A1* | 6/2021 | Regina | G06K 9/6269 |

FOREIGN PATENT DOCUMENTS

WO    2019216975 A1    11/2019

OTHER PUBLICATIONS

Written Opinion and International Search Report for Int'l. Patent Appln. No PCT/US2021/062301, dated Mar. 22, 2022 (13 pgs).

* cited by examiner

*Primary Examiner* — Leon Flores
(74) *Attorney, Agent, or Firm* — Perkins Coie LLP

(57) ABSTRACT

A method for object identification using multiple images. The method includes training an object identification model. Training the model includes collecting a training images for each of a plurality of objects, labeling each of the plurality of training images with a corresponding one of a plurality of object identifiers, and training a neural network with the plurality of labeled training images. At least two target images of a target object are receive and fed into the trained object identification model. The method further includes receiving, from the trained object identification model, for each of the at least two target images, an object identifier corresponding to the target object and a probability that the object identifier corresponds to the target object. A similarity value between the at least two target images is computed and the probabilities for the at least two target images are combined in proportion to the similarity value.

20 Claims, 9 Drawing Sheets

SYSTEMS AND METHODS FOR PART IDENTIFICATION AND ASSESSMENT USING MULTIPLE IMAGES

TECHNICAL FIELD

This patent application is directed to machine maintenance, and more specifically, to part identification and assessment.

BACKGROUND

As equipment is used, certain parts progressively wear out and should be replaced when either the part fails or it has worn to a point that it starts to degrade performance of the equipment. It can sometimes be difficult to identify a worn part as certain identifying features may have worn off, part numbers may be obscured by other parts on the machine, and/or the part is dirty. In manufacturing, parts can be mislabeled resulting in confusion and added costs.

Efforts have been made to use image recognition to identify parts to verify that the correct part is being used for replacement and to verify parts received from a supplier are correctly labeled, for example. Image recognition can also be used to detect defects in new and used parts. Image recognition techniques are known, and some methods have been developed to identify objects, such as parts.

For example, U.S. Pat. No. 10,664,722 to Sharma et al., (hereinafter "Sharma") describes a method of training a neural network for classification of large numbers of objects, e.g., as may be encountered in a supermarket. The method includes assigning training images to a plurality of buckets or pools corresponding thereto, said assigning including assigning training images that exemplify a first object class to a first bucket, and assigning training images that exemplify a second object class to a second bucket. The method further includes discovering a hot-spot excerpt within a training image that depicts an object of a particular object class, said hot-spot excerpt being more important to classification of the image by the neural network than another excerpt within said training image. A new image is created by overlaying a copy of said hot-spot excerpt on a background image and assigning the new image to a bucket that is not associated with said particular object class. The new image is presented to the neural network during a training cycle, wherein presentation of the new image to the neural network has an effect of reducing importance of the hot-spot excerpt in classifying an image that depicts an object of said particular object class.

As another example, U.S. Patent Publication No. 2019/0392318 to Ghafoor et al., (hereinafter "Ghafoor") describes a system for training a computational neural network to recognize objects and/or actions from images. The system includes a training unit configured to receive a plurality of images captured from one or more cameras, each image having an associated timestamp indicating the time the image was captured. An image identification unit is configured to identify from the plurality of images a set of images that each have a timestamp that correlates to a timestamp associated with an object and/or action from the data stream. A data-labelling unit is configured to determine, for each image of the set of images, an image label that indicates the probability the image depicts an object of each of a set of one or more specified object classes and/or a specified human action in dependence on the correlation between the timestamp for the image and the timestamp associated with the object and/or action from the data stream.

Both Sharma and Ghafoor are directed to improving image recognition methods by manipulating the sets of training images used to train an image recognition model. The methods and systems of Sharma and Ghafoor, therefore, add complexity to the already time consuming task of developing image training sets.

Thus, there are still opportunities to improve on the accuracy of image recognition for part identification and assessment. The example systems and methods described herein are directed toward overcoming one or more of the deficiencies described above.

SUMMARY

In some embodiments, a method for object identification using multiple images can include training an object identification model by collecting a plurality of training images for each of a plurality of objects and labeling each of the plurality of training images with a corresponding one of a plurality of object identifiers. Training the object identification model can include training a neural network with the plurality of labeled training images. The method can further include receiving at least two target images of a target object and feeding each of the at least two target images into the trained object identification model to receive, for each of the at least two target images, a target object identifier corresponding to the target object and a probability that the target object identifier corresponds to the target object. The method can include computing a similarity value between the at least two target images, combining the probabilities for the at least two target images in proportion to the similarity value and identifying the target object as the target object identifier.

In some aspects, collecting the plurality of training images comprises receiving a plurality of photographs for each of the plurality of objects. According to some aspects, collecting the plurality of training images comprises rendering a plurality of training images for each of the plurality of objects. In further aspects, rendering the plurality of training images comprises rendering images for each of the plurality of objects as viewed from different angles. In some aspects, the method further comprises displaying information, including an image of a part corresponding to the target object identifier located on an associated machine. In some aspects, the method further comprises displaying a set of suitable substitute parts for the part corresponding to the target object identifier.

In some embodiments, an object identification system can include one or more processors and one or more memory devices having instructions stored thereon. When executed by the one or more processors the instructions cause the one or more processors to train an object identification model by collecting a plurality of training images for each of a plurality of objects and labeling each of the plurality of training images with a corresponding one of a plurality of object identifiers. Training the object identification model can also include training a neural network with the plurality of labeled training images. The instructions can also cause the one or more processors to receive at least two target images of a target object and feed each of the at least two target images into the trained object identification model to receive, from the trained object identification model, for each of the at least two target images, a probability that the target object corresponds to each of the plurality of object identifiers. The instructions can also cause the one or more processors to compute a similarity value between the at least two target images and combine, for each of the plurality of object identifiers, the corresponding probabilities for the at least two target images in proportion to the similarity value. The instructions can also cause the one or more processors to identify the target object as the object identifier having the greatest combined probability.

According to some aspects, collecting the plurality of training images comprises receiving a plurality of photographs for each of the plurality of objects. In some aspects, collecting the plurality of training images comprises rendering a plurality of training images for each of the plurality of objects. In further aspects, rendering the plurality of training images comprises rendering images for each of the plurality of objects as viewed from different angles. In some aspects, the system further comprises normalizing the combined probabilities for each object identifier. According to some aspects, the target object is a part associated with a machine and the system further comprises receiving machine information identifying the machine and based on the machine information, removing selected object identifiers from the plurality of object identifiers. In some aspects, the system further comprises displaying information, including an image of a part corresponding to the object identifier having the greatest combined probability located on an associated machine.

In some embodiments, one or more non-transitory computer-readable media storing computer-executable instructions that, when executed by one or more processors, cause the one or more processors to perform operations. The operations can include training an object identification model by collecting a plurality of training images for each of a plurality of objects and labeling each of the plurality of training images with a corresponding one of a plurality of object identifiers. Training the wear estimate model can include training a neural network with the plurality of labeled training images. The operations can further include receiving at least two target images of a target object and feeding each of the at least two target images into the trained object identification model to receive, from the trained object identification model, for each of the at least two target images, a target object identifier corresponding to the target object and a probability that the target object identifier corresponds to the target object. The operations can include computing a similarity value between the at least two target images, combining the probabilities for the at least two target images in proportion to the similarity value, and identifying the target object as the target object identifier.

In some aspects, collecting the plurality of training images comprises receiving a plurality of photographs for each of the plurality of objects. In further aspects, collecting the plurality of training images comprises rendering a plurality of training images for each of the plurality of objects. In some aspects, rendering the plurality of training images comprises rendering images for each of the plurality of objects as viewed from different angles. According to some aspects, the operations can further comprise displaying information, including an image of a part corresponding to the target object identifier located on an associated machine. In some aspects, the operations can further comprise displaying a set of suitable substitute parts for the part corresponding to the target object identifier. In some aspects, the operations can further comprise displaying ordering information for the part corresponding to the target object identifier.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
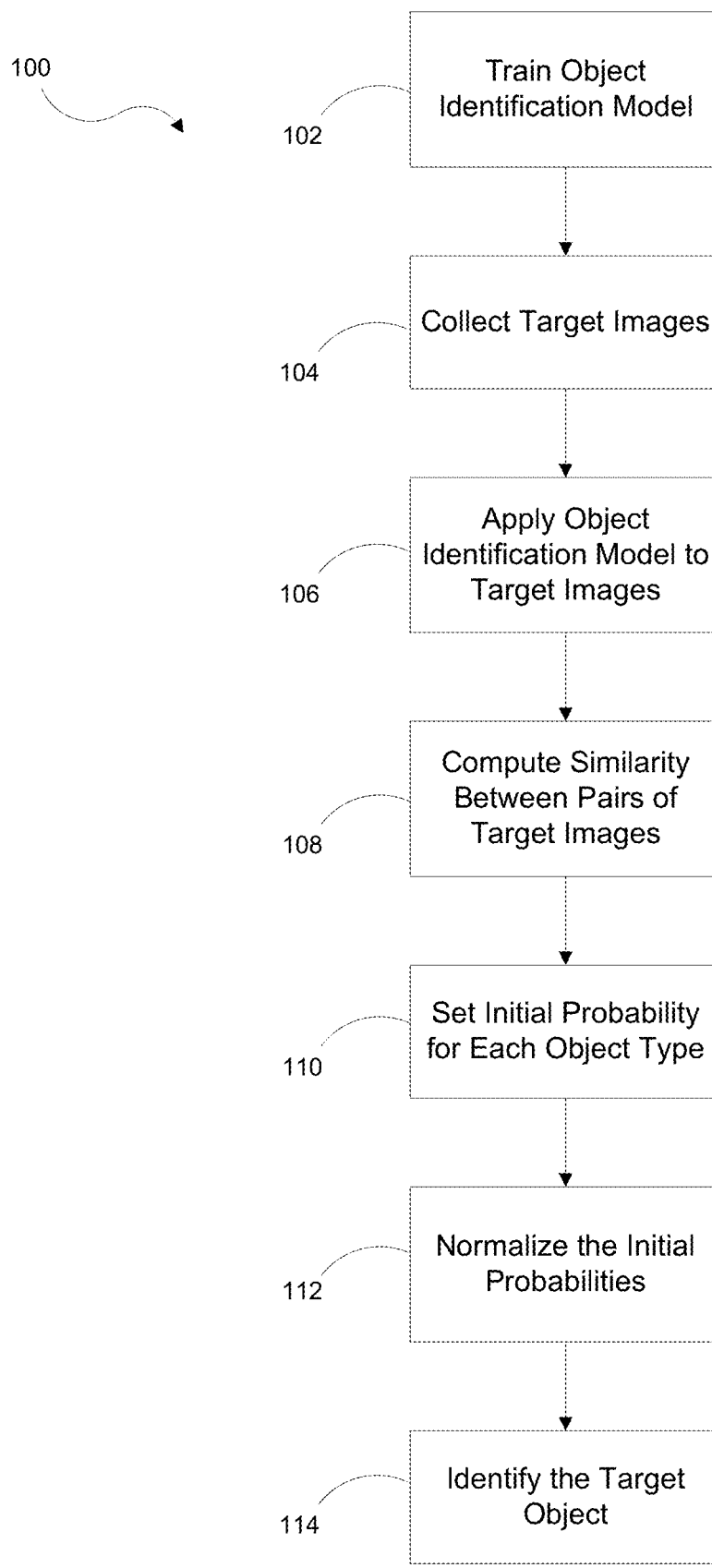
FIG. 1 is a flow diagram showing a method for object identification using multiple images according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for object identification using multiple images from different angles. The technology disclosed herein provides novel methods for combining probabilities derived from multiple images to improve part identification accuracy. The disclosed technology can also account for multiple images that are not all from different angles.

Recognizing objects, such as service parts, from images is often challenging due to slight differences in parts requiring the object to be viewed from multiple angles. For example, to identify a part X (e.g., a coupling with a type A connector), one photo from above (top down view) is needed to identify it as a coupling, and another photo down its axis (frontal view) is needed to identify the connection type.

Typical image recognition algorithms, such as recurrent neural networks, operate on one image at a time. For example, from the top down view, a typical algorithm might determine with 20% certainty that a part is part X. From the frontal view, an algorithm might determine with 50% certainty that a part is part X.

Assuming the images are independent, the likelihood of a part being part X can be calculated using the inclusion/exclusion rule for combining independent events, as follows:

$$1-P(\text{not } X|\text{first image}) \times P(\text{not } x|\text{second image}) = 1 - 0.8 \times 0.5 = 0.6$$

The probability of a part being part X using combined image probabilities is thus 60%, which is higher than either independent assessment using typical techniques. However, when the images are the same or very similar (e.g., from exactly the same angle) the above noted calculation provides erroneous results.

Identification of an object via two images of completely different aspects of the object (e.g., different angles) are independent events. Identification of an object via two very similar images are not independent, as the probability of identification from one image is highly correlated with the probability from the other. In other words, multiple images of an object from the same angle contribute little extra information to the identification process.

Assuming the two photos are from the top down view (20% certainty that the part is part X) the calculation is as follows:

$$1-P(\text{not } X|\text{first image}) \times P(\text{not } x|\text{second image}) = 1 - 0.8 \times 0.8 = 0.36$$

Thus, using the inclusion/exclusion rule provides an erroneous 36% probability when it should be 20%. In this case, the additional photo does not provide any additional information over the initial 20% probability that the part is part X.

The disclosed technology can also combine identification analyses based on multiple images in such a way as to account for when the additional images contribute additional information (e.g., independent images from different angles) to the overall identification and when they do not (e.g., identical images). As explained more fully below, the similarity of the images is measured and the probabilities for the images are combined in proportion to their similarities in order to account for similar images.

FIG. 1 is a flow diagram showing a method 100 for object identification using multiple images according to some embodiments of the disclosed technology. The method 100 can include training an object identification model at step 102, which is further described below with respect to FIG. 2. The object identification model is trained to identify a plurality of object types, each associated with an object identifier j.

At least two target images (i.e., image a and image b) of a target object are received at step 104. The target object can be a part for an asset, e.g., a machine. Assets can include, for example, trucks, tracked-type tractors, excavators, wheel loaders, front end loaders, and other equipment.

At step 106, each of the at least two target images are fed into the trained object identification model and for each of the at least two target images, a probability (e.g., p(a,j) and p(b,j)) that the target object corresponds to each of the plurality of object identifiers j is received.

At step 108, a similarity value s(a,b) is computed between the two target images. In some embodiments, where there are more than two target images, the similarity between each pair of images is computed. Any suitable similarity algorithm can be used to compare the two images. In some embodiments, a Scale Invariant Feature Transform (SIFT) algorithm can be used to compute the similarity. Regardless of which algorithm is used, s(a,b) is scaled for a range of [0,1] where 0 represents identical images and 1 represents completely dissimilar images.

For each of the plurality of object identifiers j, the corresponding probabilities (e.g., p(a,j) and p(b,j)) for the target images are combined in proportion to the similarity value (e.g., s(a,b)). Thus, at step 110 for each of the plurality of object identifiers j, the initial probability P(j) that the target image is of type j is set as follows, where n is the number of target object images:

$$P(j) := \text{sum}(a=1 \text{ to } n)\{p(a,j) \times [\text{product}(b=1 \text{ to } a-1)(1-p(b,j))s(a,b)]\}$$

At step 112, the initial probabilities P(j) are normalized to sum to 1 as follows, where k is the number of different object identifiers j:

$$P^*(j) := P(j)/\text{sum}(a=1 \text{ to } k)P(a).$$

At step 114, the target object is identified as the object identifier j having the greatest combined probability. That is, identify the target object to be of object identifier x where:

$$x = \arg\max P^*(j) \text{ over } j=1, \ldots k.$$

Figure 2:
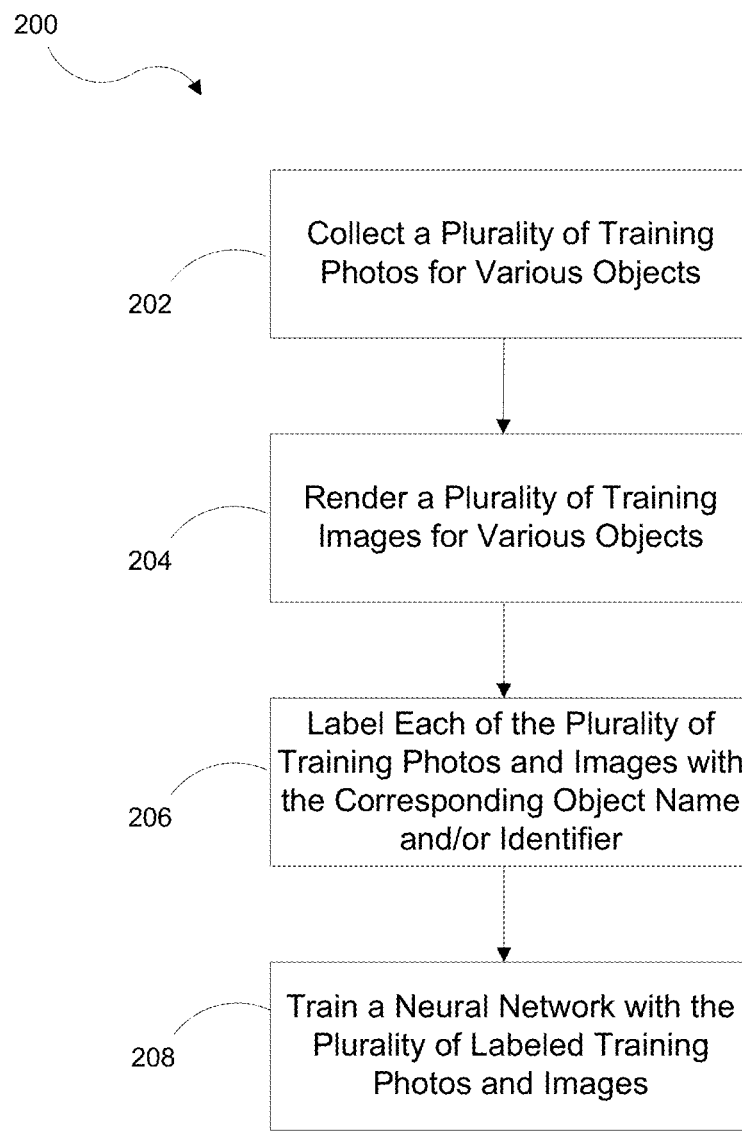
FIG. 2 is a flow diagram showing a method for training an object identification model according to some embodiments of the disclosed technology.

FIG. 2 is a flow diagram showing a method 200 for training an object identification model according to some embodiments of the disclosed technology. The method 200 can include collecting a plurality of training images for each of a plurality of objects (e.g., a library of training images). This can include collecting a plurality of training images, in the form of photographs, for each of the plurality of objects, at step 202 and/or rendering a plurality of training images for each of the plurality of objects, at step 204. Each of the plurality of training images (e.g., photos and renderings) is labeled with a corresponding one of a plurality of object identifiers (e.g., a part number) at step 206. Each image can also be labeled with a part name and various specifications, such as for example, part weight, color, material, revision, etc. At step 208, a neural network can be trained using the plurality of labeled training images. In some embodiments, the neural network can be a recurrent neural network.

The more training images in the library, with the more variety, the more likely the object identification model (e.g., neural network) will be to correctly identify an image under new circumstances rather than overfitting on a limited training set. For example, if the model is only trained on images of clean parts with good lighting against a black background, centered and oriented at a 90 degree angle, it may have trouble recognizing a dirty part off to the side of an image taken at an angle in poor lighting.

Figure 3A:
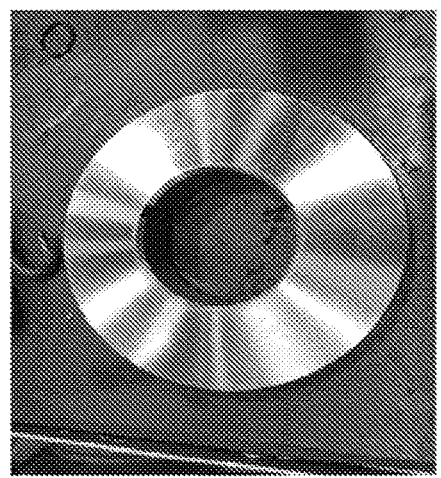
FIG. 3A is an original photo of a part for use in training an object identification model.
Figure 3B:
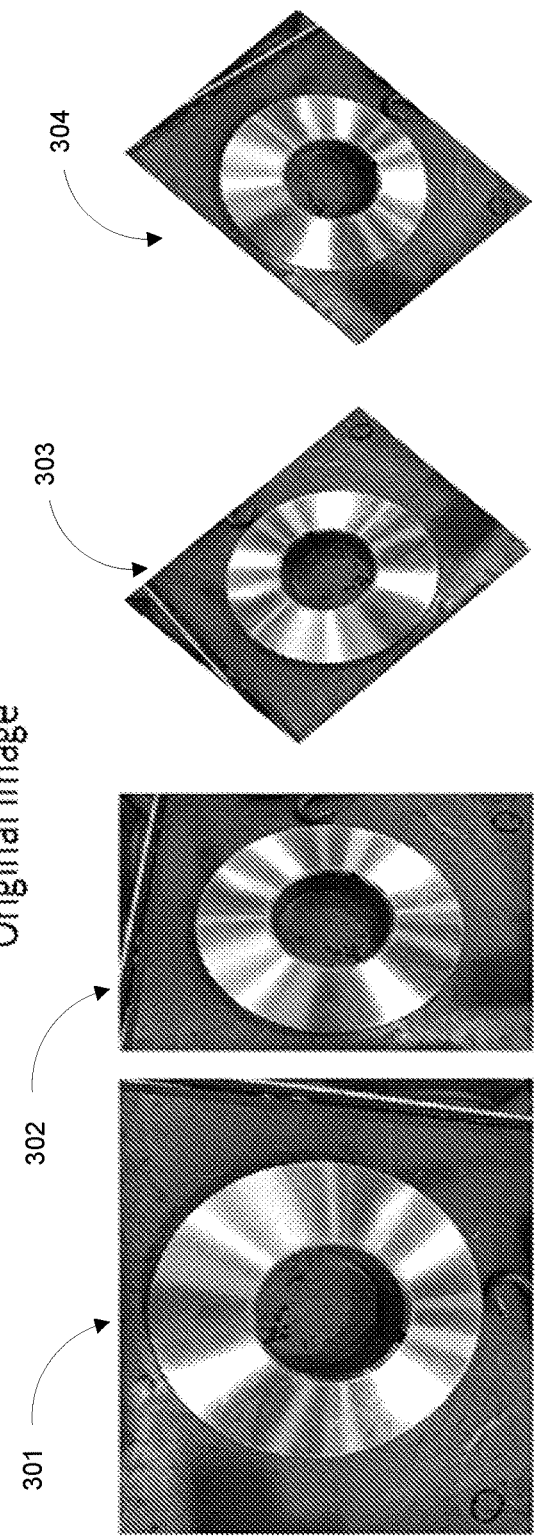
FIG. 3B are augmented images for use in training an object identification model.

FIG. 3A is an original photo 300 of a part for use in training an object identification model. FIG. 3B shows four augmented images 301-304 that can also be used for training the model. The augmented images 301-304 are each rotated to provide a different angle. These photos can be rotated using image editing software and/or can be originally photographed from different angles. For more complicated parts, different photos can be taken from different angles.

Generating a comprehensive library of training images with photographs can be time consuming. However, virtual images may be rendered from any number of angles, with different lighting effects, with dirt and other obscuring substances applied, against a wide variety of backgrounds. These images may be used instead of or in combination with actual photographs. Additionally, each correct identification also adds to the library of labelled training images.

Training images can be rendered with computer aided design (CAD) tools to create photo-realistic images of parts. This novel approach to developing a training library allows many training images to be created, each having accurate and detailed labeling. Because the training images are produced from CAD models, images of a part as viewed from different angles can easily be created. Also, different lighting effects and backgrounds can be applied to the images. In some embodiments, simulated rust and dirt can be applied to represent typical conditions of a part in use. Many CAD programs also allow for parametric modeling by which dimensions of the part can be managed by tabulated data. Using parametric modeling, the creation of part images for different sizes and configurations, for example, can be automated. In addition, the angles from which the part is viewed can be automated using parametric modeling.

Figure 4A:
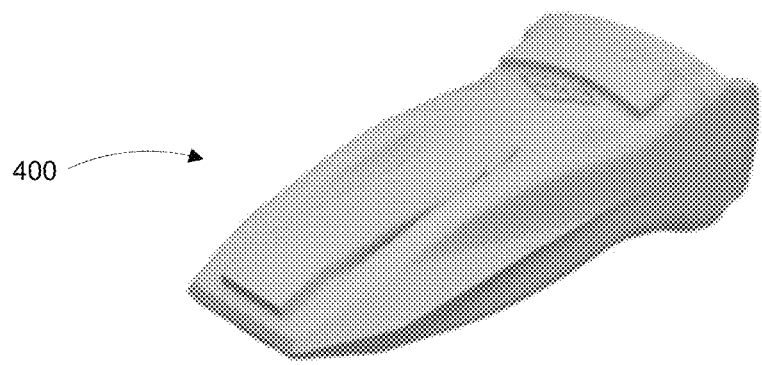
FIG. 4A is a perspective view depicting a rendered image of a machine part.
Figure 4B:
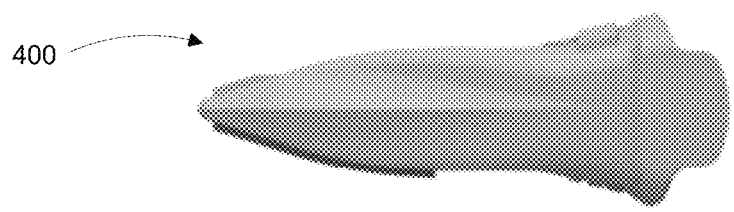
FIG. 4B is a side view of the rendered image of the machine part shown in FIG. 4A.
Figure 4C:
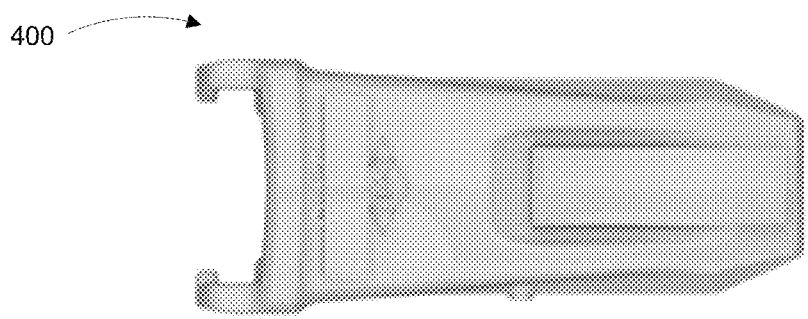
FIG. 4C is a top view of the rendered image of the machine part shown in FIGS. 4A and 4B.

FIGS. 4A-4C are various views depicting rendered images of a machine part 400 (e.g., excavator tooth) from different angles. FIG. 4A shows a perspective view of the excavator tooth 400. FIG. 4B shows a side view of the excavator tooth 400. And, FIG. 4C shows a top view of the excavator tooth 400. Each additional view, whether it is generated via renderings or photographs, adds additional information that benefits the training of a neural network for image recognition. It should be understood that CAD programs have the capability to render photo-realistic images including surfaces textures, colors, and reflections representing different materials such as metal, plastic, and rubber to name a few.

Figure 5:
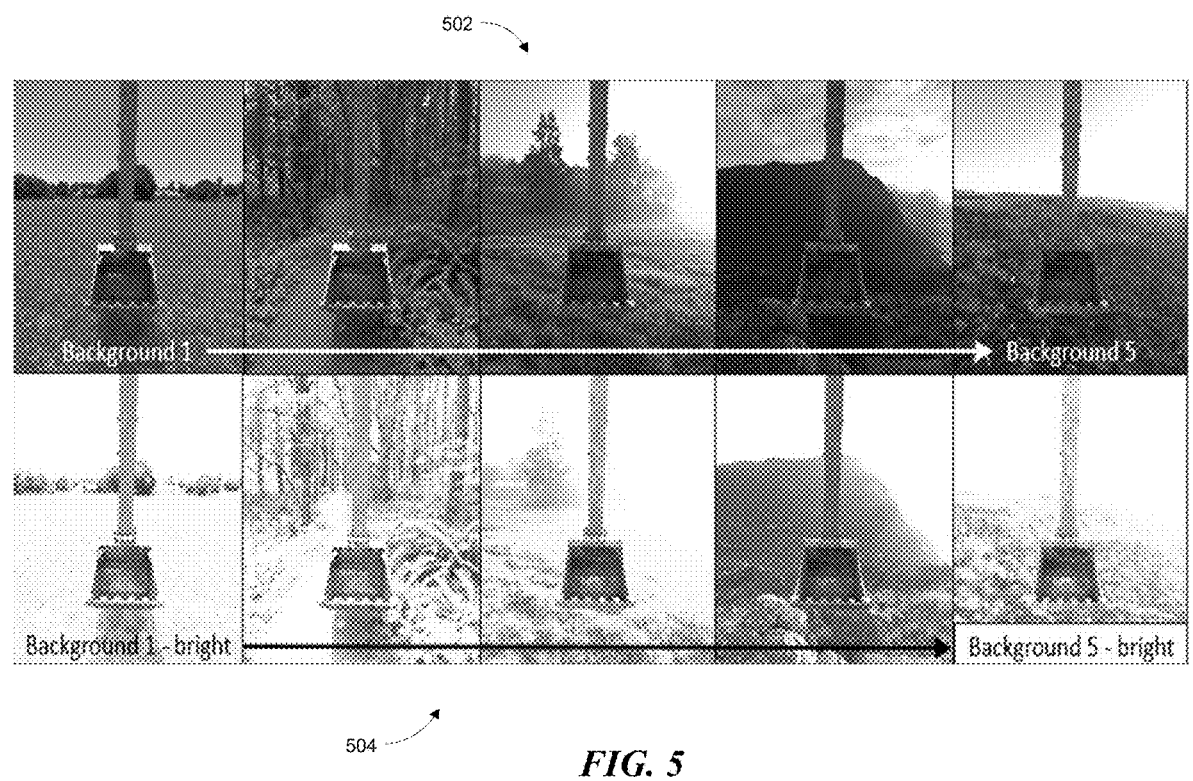
FIG. 5 depicts renderings illustrating various image backgrounds and brightness levels for creating training images.

FIG. 5 depicts renderings illustrating various image backgrounds and levels of brightness for creating training images of an excavator bucket. For example, in row 502 the images include backgrounds ranging from a grassy field, a wooded area, and mountainous areas. As shown in row 504, each of these rendered images can be adjusted by adding brightness to the images. As noted above, with the more variety in the training library, the more likely the object identification model (e.g., neural network) will be to correctly identify an image under new circumstances. As shown in the figure, the renderings can also include rust and dirt applied to the bucket and arm in a photo-realistic manner.

To facilitate further accuracy, in some embodiments, the photograph(s) of the target object may be taken from standardized positions with standardized backgrounds, lighting, etc. The part may also be cleaned prior to photographing. In some embodiments, the photographs can be taken with typical digital cameras or cellphone cameras. In some embodiments, a user can be prompted to take additional photos of the target object until a threshold level of confidence is achieved, such as 85%.

In some embodiments, limiting the scope of what object types should be considered can greatly increase the probability of a correct identification of a part. For example, if the type and/or serial number of an asset is known, consideration of object types can be limited to only those parts that will fit on that asset. Furthermore, if the specific object type (e.g., excavator tooth) being examined is known, the scope can be narrowed even further. Accordingly, a user can be prompted to enter any known information about an associated machine and the part to be identified. In some embodiments, the user can capture a photograph of the machine, and through image recognition of the machine, the user can be guided to the serial number location for that machine.

In some cases two objects may appear identical from every angle but be of very different sizes, see for example FIG. 3A. It would be difficult to distinguish between different sizes of the part shown in FIG. 3A. As another example, consider two bolts where one is just a scaled-up version of the other. To differentiate between such objects, two images can be taken approximately simultaneously but from slightly different positions (e.g., images taken from the multiple lenses of modern mobile phones) and via stereo image parallax calculations the size of the target object can be estimated.

Figure 6:
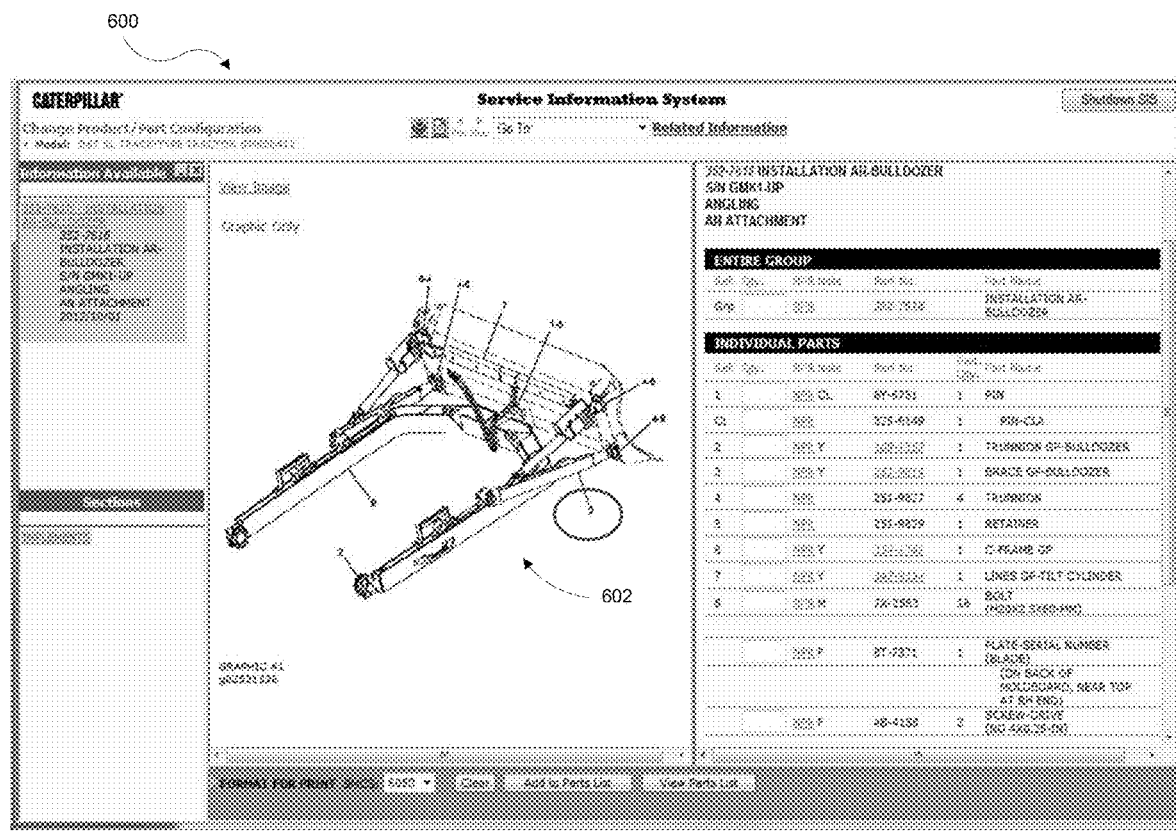
FIG. 6 is a representative part information and ordering display according to some embodiments of the disclosed technology.

FIG. 6 is a representative part information and ordering display 600 according to some embodiments of the disclosed technology. Once a part is identified with sufficient confidence based on image recognition, information about the part can be displayed to a user, including an image 602 of the part located on an associated machine and/or subassembly showing related parts. The user can also be prompted to verify that the part image 602 corresponds to the identified target object, thereby validating the object identification model was correct. In some embodiments, the system can also display a set of suitable substitute parts. In some embodiments, the system can be configured to enable the part to be purchased (i.e., show an ordering page, add it to a cart, or even automatically order it). The system can also display the part's specifications (e.g., part weight, color, material, revision, part number, etc.) and provide information related to installation procedures and maintenance.

In some embodiments, the above described part recognition technology can be employed to facilitate systems for identifying part conditions, e.g., dirty, rusty, bent, broken, or otherwise damaged or worn. With an estimate of the current wear on a part, the system can estimate impacts on performance of the machine in terms of cost. Coupled with information regarding machine usage the system can determine when the cost of operating with a worn part would exceed the costs to replace the part. This capability applies to parts that degrade through wear that is visually detectable as a change in the shape or appearance of the part. For example and without limitation, such parts can include ground engaging tools, undercarriage parts, and tires. Assets include trucks, tracked-type tractors, excavators, wheel loaders, front end loaders, and other equipment.

A method for part replacement timing optimization can include training a wear estimate model by predicting a plurality of wear patterns for a part, each wear pattern corresponding to a degree of severity, and rendering a plurality of training images, each representing a corresponding one of the plurality of wear patterns. Training the wear estimate model can include labeling each of the plurality of training images with the corresponding degree of severity and training a neural network with the plurality of labeled training images. The method can further include receiving a part image of a deployed part associated with a machine and feeding the part image into the trained wear estimate model to receive a wear estimate for the part image from the trained wear estimate model. The method can include estimating a change in performance of the machine based on the wear estimate and determining a machine utilization pattern for the machine. The method can further include combining the machine utilization pattern and the change in performance estimate to determine an optimal time to replace the part.

These methods and systems for part replacement timing optimization are further described in co-pending U.S. application Ser. No. 17/123,058, filed Dec. 15, 2020, entitled SYSTEMS AND METHODS FOR WEAR ASSESSMENT AND PART REPLACEMENT TIMING OPTIMIZATION, the disclosure of which is incorporated herein by reference in its entirety.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
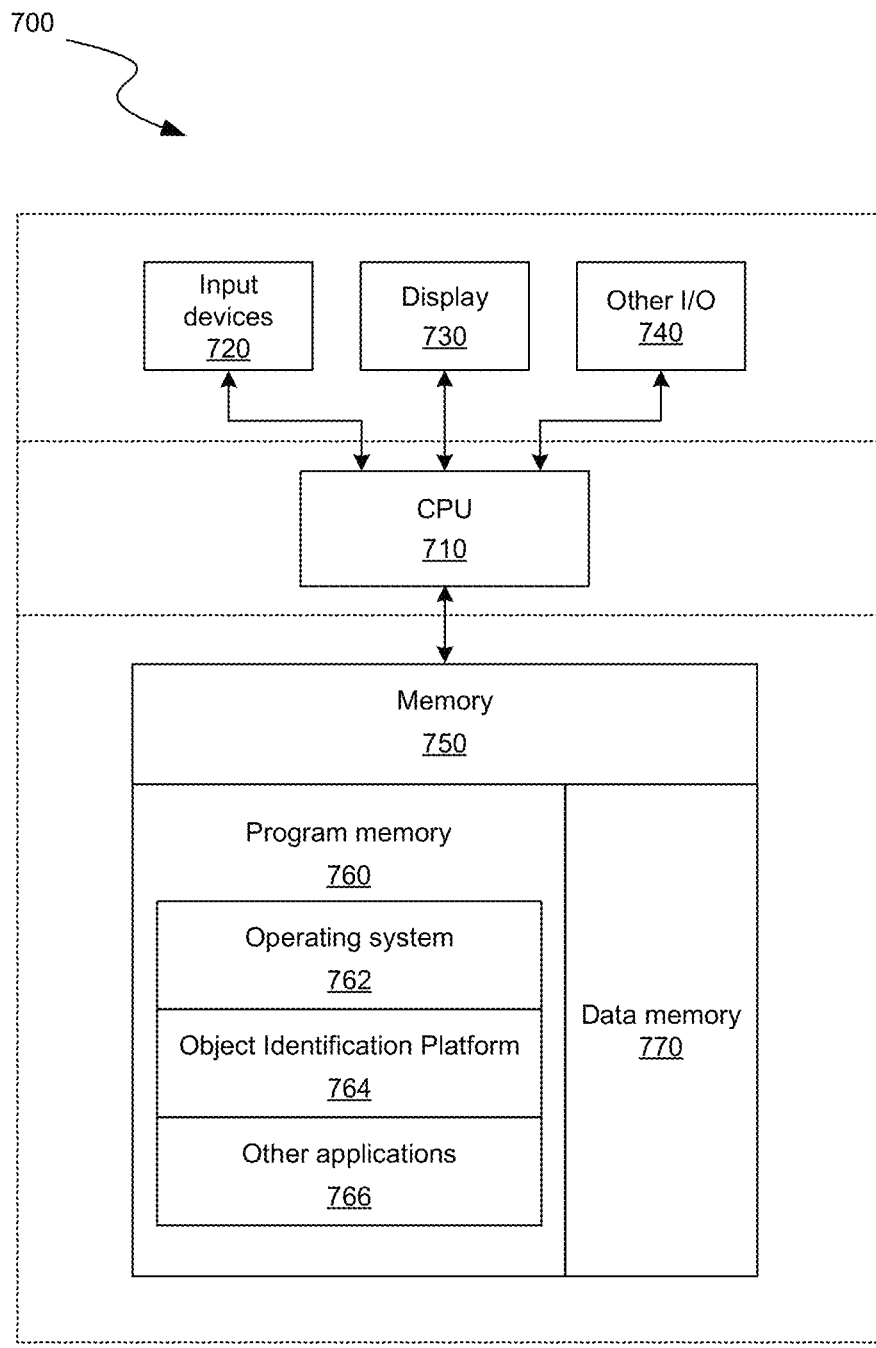
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that performs object identification, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, Object Identification Platform 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
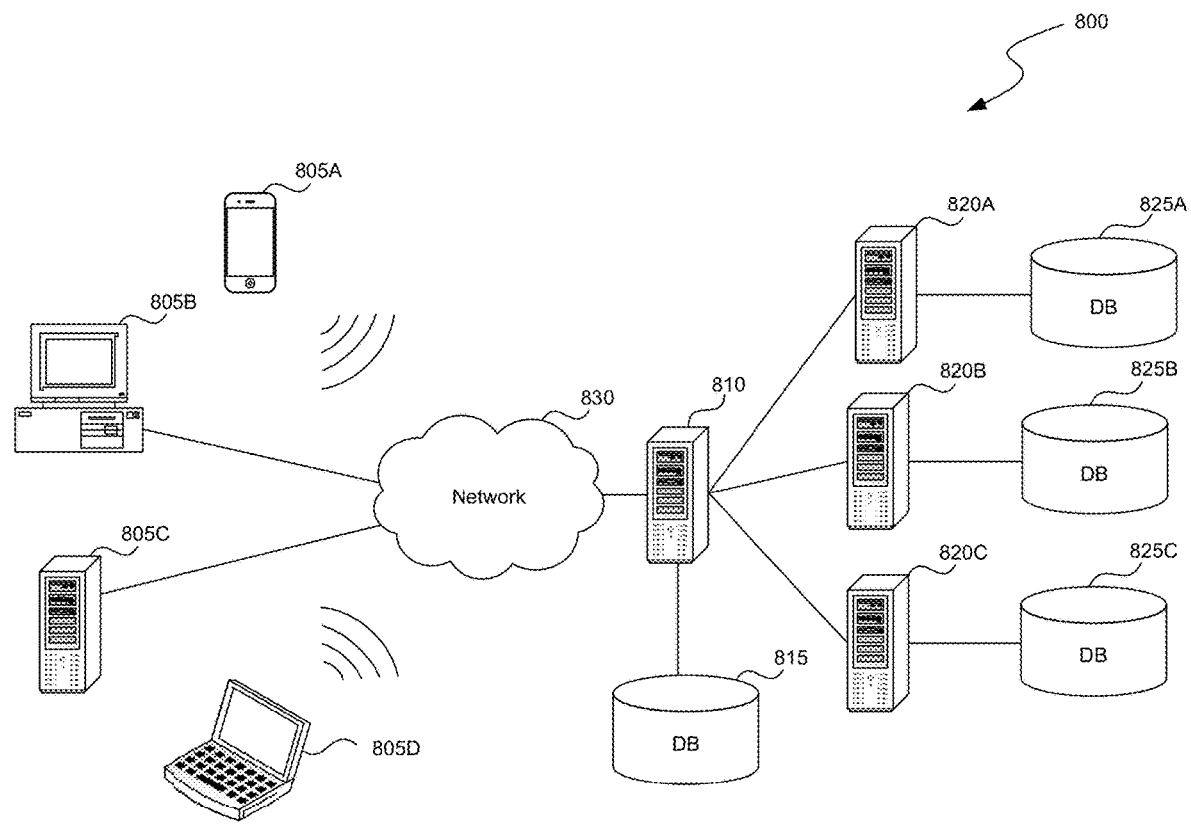
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
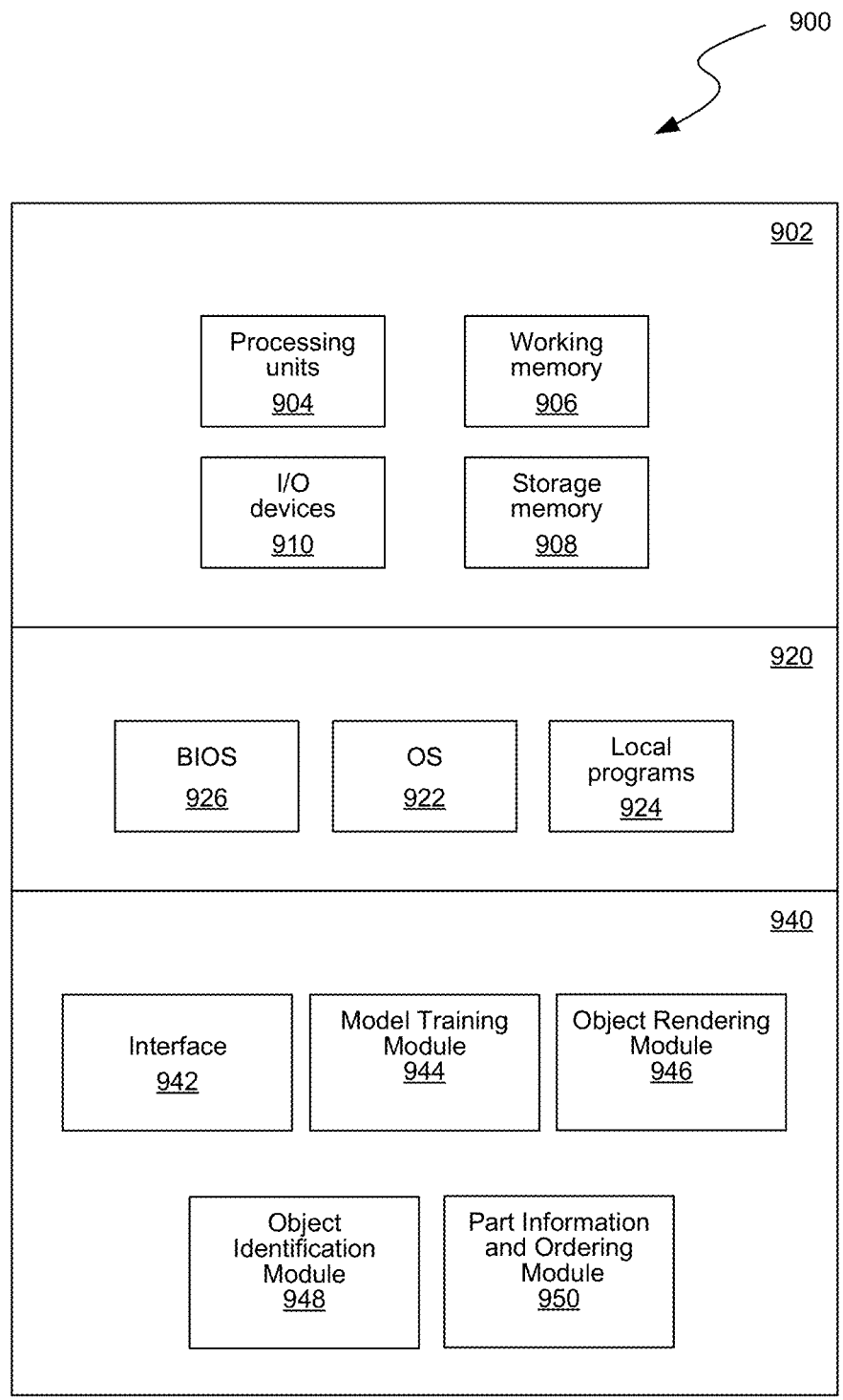
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Model Training Module 944, an Object Rendering Module 946, an Object Identification Module 948, a Part Information and Ordering Module 950, and components that can be used for transferring data and controlling the specialized components, such as Interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, an object identification system using multiple images can include a model training module 944, an object rendering module 946, an object identification module 948, and a part information and ordering module 950 (FIG. 9). In operation, the model training module 944 can train an object identification model by collecting a plurality of training images for each of a plurality of objects and labeling each of the plurality of training images with a corresponding one of a plurality of object identifiers. Training the object identification model can also include training a neural network with the plurality of labeled training images. In some embodiments, the collected training images can include photographs as well as rendered training images for each of the plurality of objects generated via the object rendering module 946. The rendered training images can comprise rendered images for each of the plurality of objects as viewed from different angles.

The object identification module 948 can receive at least two target images of a target object and feed each of the at least two target images into the trained object identification model to receive, from the trained object identification model, for each of the at least two target images, a probability that the target object corresponds to each of the plurality of object identifiers. The object identification module 948 can also compute a similarity value between the at least two target images and combine, for each of the plurality of object identifiers, the corresponding probabilities for the at least two target images in proportion to the similarity value. The object identification module 948 causes the one or more processors to identify the target object as the object identifier having the greatest combined probability.

Once a part is identified with sufficient confidence (e.g., greater than a threshold probability) based on image recognition, information about the part can be displayed to a user via the part information and ordering module 950. This information can include an image of the part located on an associated machine and/or subassembly showing related parts. In some embodiments, the system can also display a set of suitable substitute parts. The system can be configured to enable the part to be purchased (i.e., show an ordering page, add it to a cart, or even automatically order it), display the part's specifications (e.g., part weight, color, material, revision, part number, etc.), and provide information related to installation procedures and maintenance. In some embodiments, the above described part recognition technology can be employed to facilitate systems for identifying part conditions, (e.g., dirty, rusty, bent, broken, or otherwise damaged or worn) and optimizing the part replacement timing.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for object identification using multiple images, comprising: training an object identification model, including: collecting a plurality of training images for each of a plurality of objects; labeling each of the plurality of training images with a corresponding one of a plurality of object identifiers; and training a neural network with the plurality of labeled training images; receiving at least two target images of a target object; feeding each of the at least two target images into the trained object identification model; receiving, from the trained object identification model, for each of the at least two target images, a target object identifier corresponding to the target object and a probability that the target object identifier corresponds to the target object; computing a similarity value between the at least two target images; combining the probabilities for the at least two target images in proportion to the similarity value; and identifying the target object as the target object identifier based on the combined probabilities.

2. The method of claim 1, wherein collecting the plurality of training images comprises receiving a plurality of photographs for each of the plurality of objects.

3. The method of claim 1, wherein collecting the plurality of training images comprises rendering a plurality of training images for each of the plurality of objects.

4. The method of claim 3, wherein rendering the plurality of training images comprises rendering images for each of the plurality of objects as viewed from different angles.

5. The method of claim 1, further comprising displaying information, including an image of a part corresponding to the target object identifier located on an associated machine.

6. The method of claim 5, further comprising displaying a set of suitable substitute parts for the part corresponding to the target object identifier.

7. An object identification system, comprising: one or more processors; and one or more memory devices having stored thereon instructions that when executed by the one or more processors cause the one or more processors to: train an object identification model, including: collecting a plurality of training images for each of a plurality of objects; labeling each of the plurality of training images with a corresponding one of a plurality of object identifiers; and training a neural network with the plurality of labeled training images; receive at least two target images of a target object; feed each of the at least two target images into the trained object identification model; receive, from the trained object identification model, for each of the at least two target images, a probability that the target object corresponds to each of the plurality of object identifiers; compute a similarity value between the at least two target images; combine, for each of the plurality of object identifiers, the corresponding probabilities for the at least two target images in proportion to the similarity value; and identify the target object as the object identifier having a greatest combined probability.

8. The system of claim 7, wherein collecting the plurality of training images comprises receiving a plurality of photographs for each of the plurality of objects.

9. The system of claim 7, wherein collecting the plurality of training images comprises rendering a plurality of training images for each of the plurality of objects.

10. The system of claim 9, wherein rendering the plurality of training images comprises rendering images for each of the plurality of objects as viewed from different angles.

11. The system of claim 7, further comprising normalizing the combined probabilities for each object identifier.

12. The system of claim 7, wherein the target object is a part associated with a machine and further comprising:
receiving machine information identifying the machine; and
based on the machine information, removing selected object identifiers from the plurality of object identifiers.

13. The system of claim 7, further comprising displaying information, including an image of a part corresponding to the object identifier having the greatest combined probability located on an associated machine.

14. One or more non-transitory computer-readable media storing computer-executable instructions that, when executed by one or more processors, cause the one or more processors to perform operations comprising: training an object identification model, including: collecting a plurality of training images for each of a plurality of objects; labeling each of the plurality of training images with a corresponding one of a plurality of object identifiers; and training a neural network with the plurality of labeled training images; receiving at least two target images of a target object; feeding each of the at least two target images into the trained object identification model; receiving, from the trained object identification model, for each of the at least two target images, a target object identifier corresponding to the target object and a probability that the target object identifier corresponds to the target object; computing a similarity value between the at least two target images; combining the probabilities for the at least two target images in proportion to the similarity value; and identifying the target object as the target object identifier based on the combined probabilities.

15. The one or more non-transitory computer-readable media of claim 14, wherein collecting the plurality of training images comprises receiving a plurality of photographs for each of the plurality of objects.

16. The one or more non-transitory computer-readable media of claim 14, wherein collecting the plurality of training images comprises rendering a plurality of training images for each of the plurality of objects.

17. The one or more non-transitory computer-readable media of claim 16, wherein rendering the plurality of training images comprises rendering images for each of the plurality of objects as viewed from different angles.

18. The one or more non-transitory computer-readable media of claim 14, further comprising displaying information, including an image of a part corresponding to the target object identifier located on an associated machine.

19. The one or more non-transitory computer-readable media of claim 18, further comprising displaying a set of suitable substitute parts for the part corresponding to the target object identifier.

20. The one or more non-transitory computer-readable media of claim 18, further comprising displaying ordering information for the part corresponding to the target object identifier.

* * * * *